United States Patent [19]
Studebaker

[11] Patent Number: 5,940,012
[45] Date of Patent: Aug. 17, 1999

[54] COLLISION AVOIDANCE SYSTEM AND METHOD FOR OPERATING THE SAME

[75] Inventor: C. V. Studebaker, Redmond, Wash.

[73] Assignee: Collision Avoidance Systems, Inc., Santa Fe Springs, Calif.

[21] Appl. No.: 08/853,779

[22] Filed: May 9, 1997

[51] Int. Cl.$^6$ ............................... B60Q 1/48; G08G 1/14
[52] U.S. Cl. ..................... 340/932.2; 340/435; 340/958; 340/691; 180/167; 367/108; 367/909
[58] Field of Search ................................. 340/932.2, 903, 340/435, 436, 958, 691; 180/167, 169; 367/909, 107, 108

[56] References Cited

U.S. PATENT DOCUMENTS

| | | | |
|---|---|---|---|
| 4,184,655 | 1/1980 | Anderberg | 340/958 |
| 5,166,746 | 11/1992 | Sato et al. | 340/958 |
| 5,303,205 | 4/1994 | Gauthier et al. | 367/909 |

*Primary Examiner*—Donnie L. Crosland
*Attorney, Agent, or Firm*—John J. Posta, Jr.

[57] ABSTRACT

A device for determining the distance between the rear of a trailer and a loading dock is disclosed which assists a driver backing the trailer up to the loading dock by visually and continuously letting the driver know how close the rear of the trailer is to the loading dock, thereby providing information to prevent the rear of the trailer from colliding with the loading dock. The distance between the back of the trailer and the loading dock is determined by an ultrasonic transducer which is mounted onto the side of the loading dock toward which the rear of the trailer will be backed. A display module mounted on the loading dock provides a numeric indication of the distance between the rear of the trailer and the loading dock. In the preferred embodiment, both a conventional numeric display (which may be read by the driver by looking out the window of the cab of the tractor and back toward the loading dock) and a reversed or mirror image (which may be read by the driver by looking in the side view mirror of the tractor back toward the loading dock or other fixed object) are provided on the display module.

20 Claims, 3 Drawing Sheets

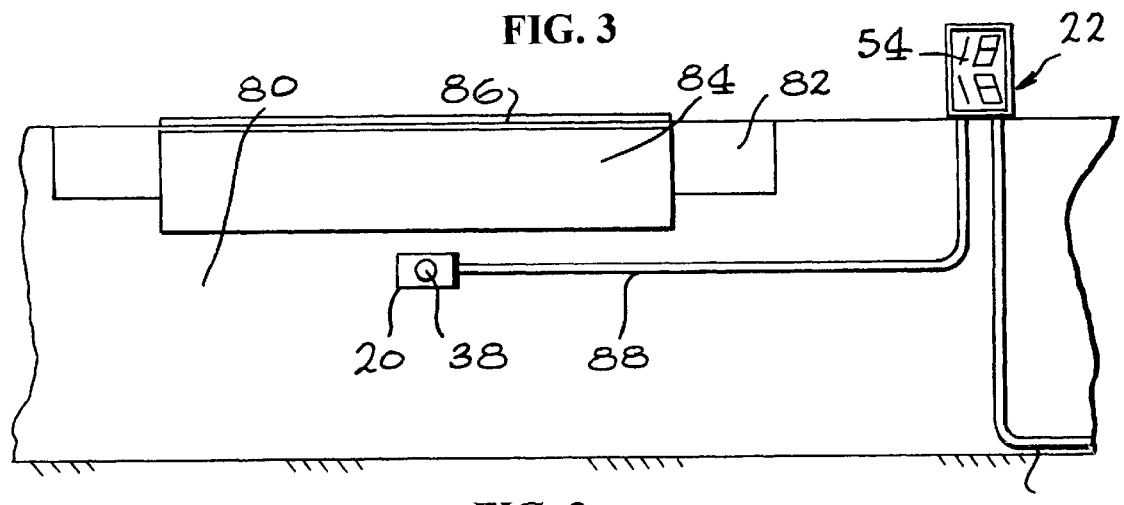
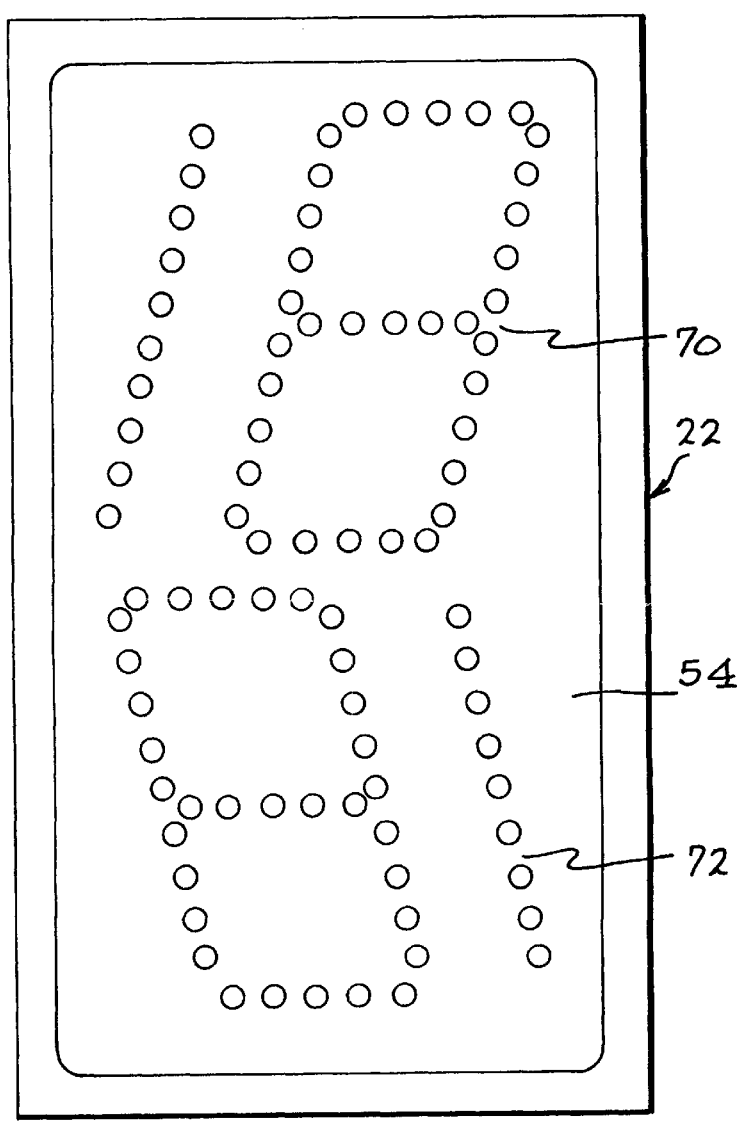

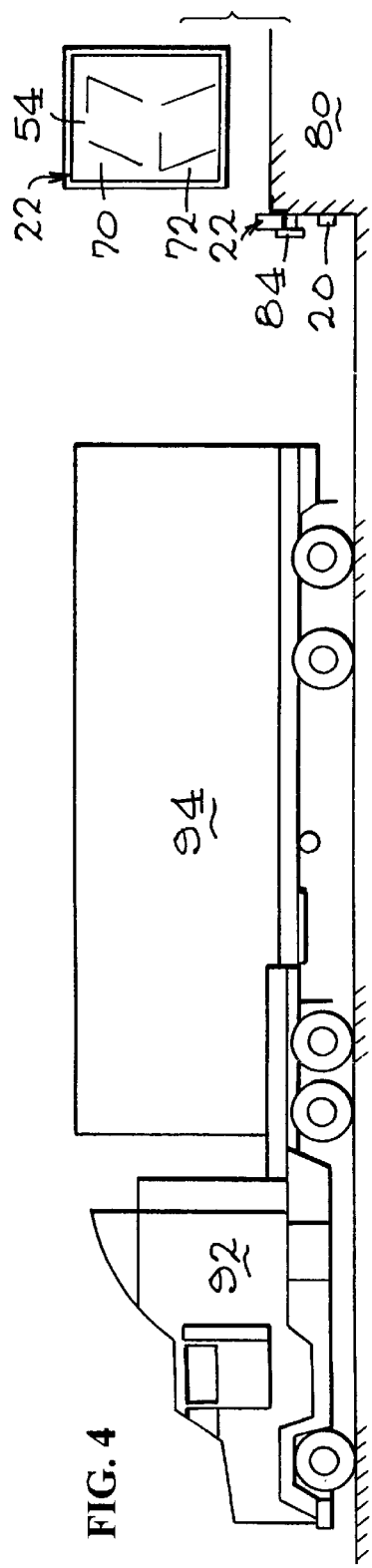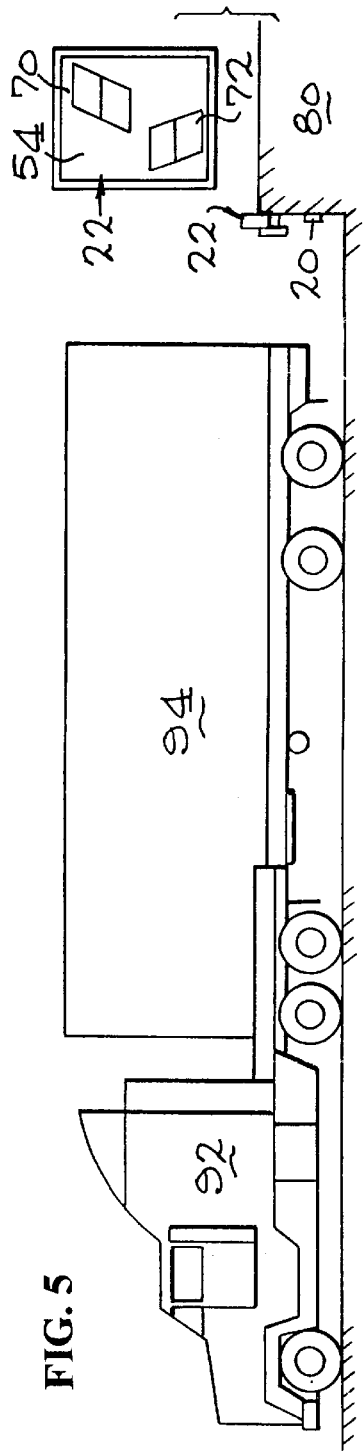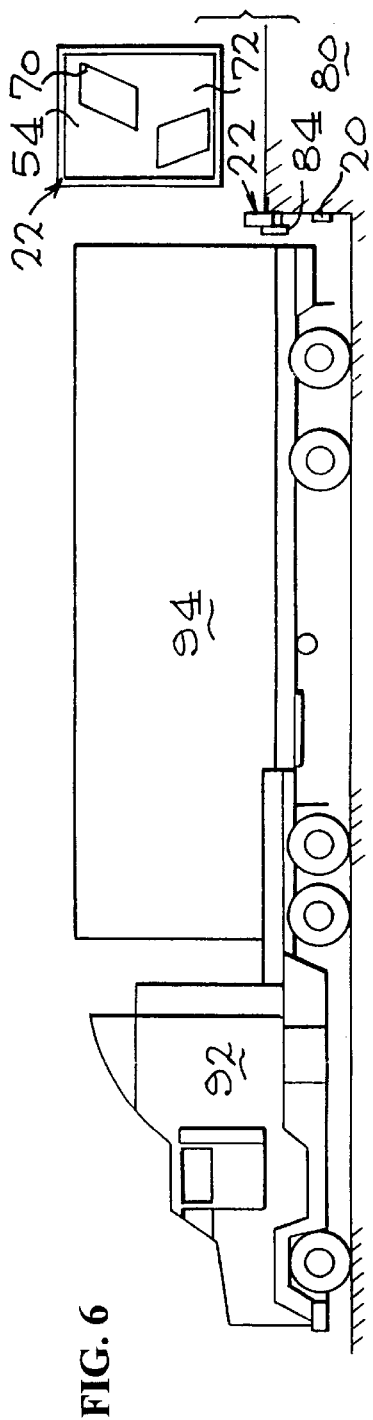

5,940,012

COLLISION AVOIDANCE SYSTEM AND METHOD FOR OPERATING THE SAME

BACKGROUND OF THE INVENTION

FIELD OF THE INVENTION

The present invention relates generally to an apparatus for determining the distance between a vehicle and a fixed object, and more particularly to a system and method for assisting a driver who is backing a tractor/trailer up to a loading dock by visually and continuously letting the driver know how close the rear of the trailer is to the loading dock, thereby providing information to the driver to prevent the trailer from being backed into the loading dock and incurring the commensurate damage associated with such a collision.

Much of the cargo moved from one location to another is moved by heavy trucks, with the most common of such trucks being a tractor/trailer combination in which a large tractor is used to tow a variety of long trailers from place to place. It will be appreciated by those skilled in the art that such trailers extend well back of the cab of the tractor pulling them. While truck drivers are generally skilled in the operation of such large tractor/trailer combinations, one of the more difficult operations which they must perform on a frequent basis is backing the trailer up to a loading dock.

The driver must ensure that the tractor/trailer is being backed up in the proper lane, which may frequently be located between two other tractor/trailers, with relatively little space therebetween. In addition, the driver must accurately gauge the distance between the rear of the trailer and the edge of the loading dock, so that the tractor/trailer can be stopped in the proper position just prior to running into the loading dock. While it is relatively easy to stop the tractor/trailer in the proper position when assisted by a second person located adjacent the loading dock and at one side of the trailer, it will be appreciated that it is difficult for the driver alone to back the trailer to a position just short of the loading dock.

When the driver of a tractor/trailer does not have assistance from a second person, in order to avoid backing the trailer into the loading dock it may be necessary for the driver to stop at a position which may be well short of the loading dock, get out of the tractor, go to the rear of the trailer to see how much distance remains between the rear of the trailer and the loading dock, and then return to the cab of the tractor and continue backing up. More than one such trip from the cab of the tractor to the rear of the trailer may be necessary to properly position the rear of the trailer at the loading dock without hitting the loading dock. With the heavy weight of the tractor/trailer, particularly when the trailer is loaded, it will be appreciated that significant damage can be done to the rear of the trailer even at very slow speeds.

It is accordingly the primary objective of the present invention that it provide the driver of a tractor/trailer with an apparatus and a related method of operating the apparatus for providing an indication of the distance remaining between the rear of the trailer and a loading dock or other similar fixed object as the trailer is backed toward the loading dock or other fixed object. It is a further objective of the collision avoidance system of the present invention that it be permanently mountable on a loading dock or other fixed object in a manner such that it will reliably determine the distance between the rear of a trailer being backed toward the loading dock or other fixed object and the loading dock or other fixed object. It is a related objective of the collision avoidance system of the present invention that it be capable of providing a minimum offset distance between the rear of a trailer and the loading dock or other object such that there may be an adjustable small space, e.g. a few inches, between the rear of the trailer and the loading dock or other object when the tractor/trailer is properly parked at the loading dock.

It is also an objective of the collision avoidance system of the present invention that it be operable in a manner not requiring the driver of the tractor/trailer to get out of the cab of the tractor in order to determine the distance between the rear of the trailer and the loading dock or other fixed object. It is a related objective of the collision avoidance system of the present invention that a display be installed on the loading dock or other fixed object in a position which may easily be viewed by the driver while the driver is located in the cab of the tractor. It is a further related objective of the collision avoidance system of the present invention that the display mounted on the loading dock or other fixed object may be viewed by the driver either by looking out the window of the cab of the tractor and back toward the loading dock or other fixed object, or by looking in the side view mirror of the tractor back toward the loading dock or other fixed object.

The collision avoidance system of the present invention must be of a construction which is both durable and long lasting, and it should also require little or no maintenance to be provided by the user throughout its operating lifetime. In order to enhance the market appeal of the collision avoidance system of the present invention, it should also be of relatively inexpensive construction to thereby afford it the broadest possible market. Finally, it is also an objective that all of the aforesaid advantages and objectives of the collision avoidance system of the present invention be achieved without incurring any substantial relative disadvantage.

SUMMARY OF THE INVENTION

The disadvantages and limitations of the background art discussed above are overcome by the collision avoidance system of the present invention. With this invention, a transducer module is mounted onto the side of a loading dock or other fixed object toward which the rear of a trailer will be backed. The transducer module contains an ultrasonic transducer and circuitry for operating the ultrasonic transducer to determine the distance between the back of the trailer and the loading dock or other fixed object. An offset adjustment switch is provided to determine the minimum offset distance, e.g. a few inches, between the rear of the trailer and the loading dock or other object which will exist when the tractor/trailer is properly parked at the loading dock. When the rear of the trailer is located this minimum distance away from the loading dock or other fixed object, the transducer module will provide an indication that the distance between the rear of the trailer and the loading dock is zero.

The collision avoidance system of the present invention also provides a display module which may be mounted on the loading dock or other fixed object at a location which will be to the side (preferably, the left side) of the rear of the trailer when it is properly parked at the loading dock or other fixed object. Thus, the display module may easily be seen by the driver of the tractor as the trailer is backed up toward the loading dock or other fixed object. From this description, it will be apparent to those skilled in the art that the display may be viewed by the driver of the tractor by either looking out the window of the cab of the tractor and back toward the loading dock or other fixed object, or by looking in the side view mirror of the tractor back toward the loading dock or other fixed object. The display module will display the distance between the rear of the trailer and the loading dock or other fixed object which is determined by the transducer module.

In the preferred embodiment, the display module contains first and second numeric displays which are preferably of different colors so that the desired display will be highly distinguishable from the other numeric display. A first numeric display is conventional and is viewable by looking directly at the display module, and a second numeric display is reversed (a mirror image) such that it is viewable by looking at the reflection of the display module in a mirror. Thus, the first numeric display may be viewed by the driver of the tractor by looking out the window of the cab of the tractor and back toward the loading dock or other fixed object, while the second numeric display is reversed and may be viewed by the driver of the tractor by looking in the side view mirror of the tractor back toward the loading dock or other fixed object.

The transducer module is electrically connected to the display module by a cable extending therebetween, and the collision avoidance system is supplied with electrical power to operate it. In a first optional aspect of the collision avoidance system of the present invention, an audible alarm may be provided when the transducer module determines that there is zero distance between the rear of the trailer and the loading dock or other fixed object. In a second optional aspect of the collision avoidance system of the present invention, a second display module may be located at a remote location, such as, for example, adjacent the side of the cab of a tractor as the tractor/trailer is being backed toward the loading dock or other fixed object.

It may therefore be seen that the present invention teaches an apparatus and a related method of operating the apparatus for providing an indication of the distance remaining between the rear of the trailer and a loading dock or other similar fixed object as the trailer is backed toward the loading dock or other fixed object. The collision avoidance system of the present invention is permanently mountable on a loading dock or other fixed object in a manner such that it will reliably determine the distance between the rear of a trailer being backed toward the loading dock or other fixed object and the loading dock or other fixed object. The collision avoidance system of the present invention is also capable of providing a minimum offset distance between the rear of a trailer and the loading dock or other object such that there may be an adjustable small space, e.g. a few inches, between the rear of the trailer and the loading dock or other object when the tractor/trailer is properly parked at the loading dock.

The collision avoidance system of the present invention is operable in a manner not requiring the driver of the tractor/trailer to get out of the cab of the tractor in order to determine the distance between the rear of the trailer and the loading dock or other fixed object. A display for the collision avoidance system of the present invention may be installed on the loading dock or other fixed object in a position which may easily be viewed by the driver while the driver is located in the cab of the tractor. The display of the collision avoidance system of the present invention which is mounted on the loading dock or other fixed object may be viewed by the driver either by looking out the window of the cab of the tractor and back toward the loading dock or other fixed object, or by looking in the side view mirror of the tractor back toward the loading dock or other fixed object.

The collision avoidance system of the present invention is of a construction which is both durable and long lasting, and which will require little or no maintenance to be provided by the user throughout its operating lifetime. The collision avoidance system of the present invention is also of inexpensive construction to enhance its market appeal and to thereby afford it the broadest possible market. Finally, all of the aforesaid advantages and objectives of the collision avoidance system of the present invention are achieved without incurring any substantial relative disadvantage.

DESCRIPTION OF THE DRAWINGS

These and other advantages of the present invention are best understood with reference to the drawings, in which:

FIG. 2 is a front plan view of the display module of the collision avoidance system of the present invention illustrated in FIG. 1;

FIG. 3 is a front plan view of a loading dock having the transducer module and the display module of the collision avoidance system of the present invention illustrated in FIG. 1 installed thereon;

FIG. 4 is a view from the left side of a tractor and trailer which is being backed up to the loading dock illustrated in FIG. 3, with the rear of the trailer being located seventeen feet (plus a minimum offset distance) from the loading dock, and also showing a front view of the display module of the collision avoidance system of the present invention which is inset above the loading dock indicating seventeen feet;

FIG. 5 is a view similar to the view illustrated in FIG. 4, with the rear of the trailer being located eight feet (plus the minimum offset distance) from the loading dock, with the display module indicating eight feet; and FIG. 6 is a view similar to the view illustrated in FIG. 4, with the rear of the trailer being located nine feet (plus the minimum offset distance) from the loading dock, with the display module indicating zero feet.

DETAILED DESCRIPTION OF THE PREFERRED EMBODIMENT

Figure 1:
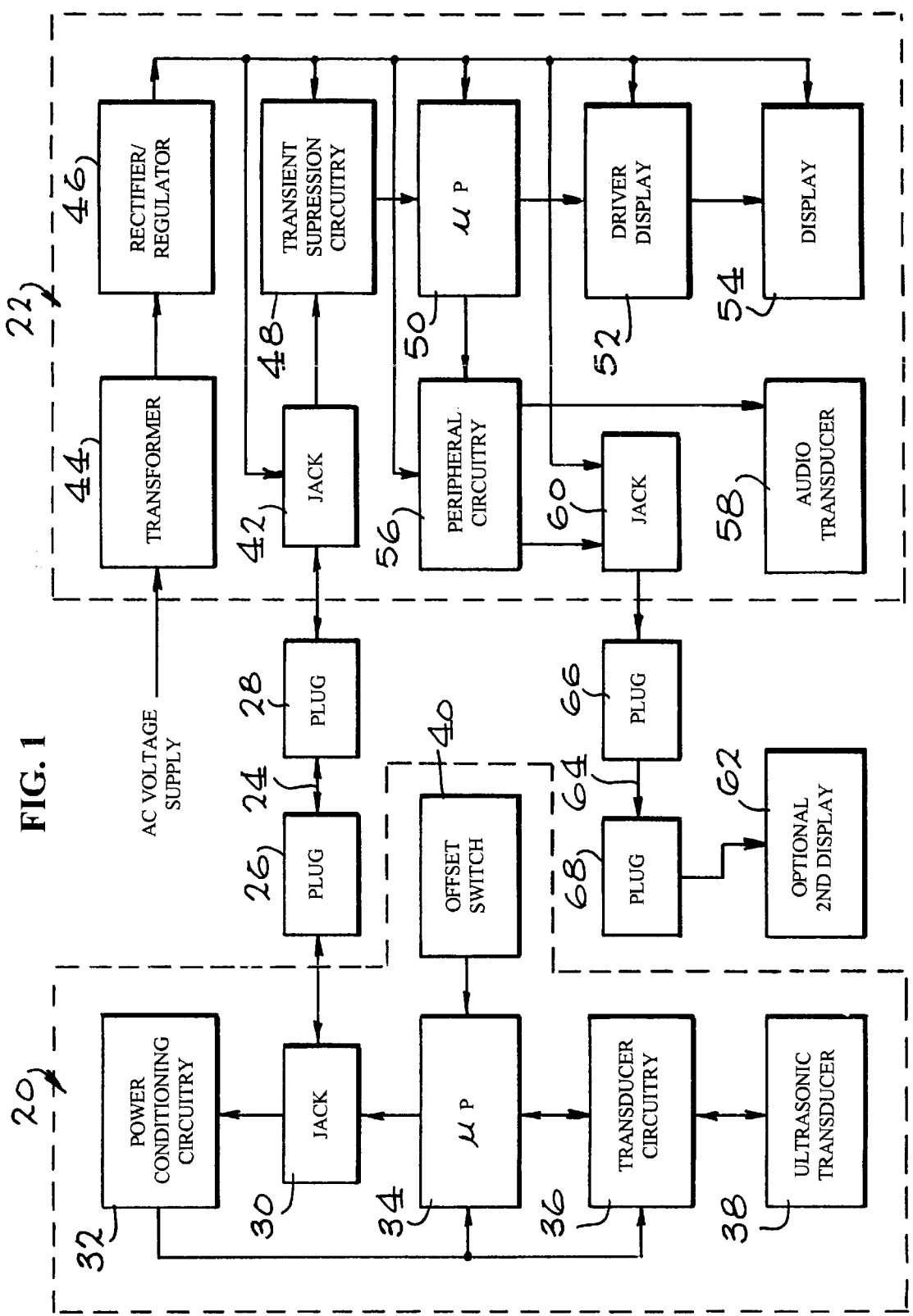
FIG. 1 is a functional schematic diagram of a collision avoidance system constructed according to the teachings of the present invention and having a transducer module and a display module which are electrically interconnected by a cable having modular connector plugs at each end thereof.

The preferred embodiment of the collision avoidance system of the present invention has two primary components which are designed to be located at separate locations which are physically spaced apart from each other. These two components are illustrated in FIG. 1, which depicts a transducer module 20 which is electrically connected to a display module 22 by a cable 24. The cable 24 has a modular plug 26 located at one end thereof, and a modular plug 28 located at the other end thereof. The modular plug 26 is for electrical connection to the transducer module 20, while the modular plug 28 is for electrical connection to the display module 22.

Referring first to the transducer module 20, it may be seen that the modular plug 26 of the cable 24 may be plugged into a modular jack 30 to electrically connect the transducer module 20 to the cable 24. The cable 24 will supply electrical power through the modular jack 30 to power conditioning circuitry 32 which conditions the electrical power to remove voltage spikes and other undesirable transients. The power conditioning circuitry 32 then supplies the conditioned power to a microprocessor 34 and transducer circuitry 36. In the preferred embodiment, the microprocessor 34 is an 8-bit microprocessor.

The transducer circuitry 36 operates an ultrasonic transducer 38, which is a combination ultrasonic transmitter/receiver such as a ※K※ series high frequency piezo transmit/receiver transducer which is available from the Polaroid OEM Group. The transducer circuitry 36 may be a ranging module for use with the ※K※ series high frequency piezo transmit/receiver transducer, and is also available from the Polaroid OEM Group. Such ultrasonic transmitter/receivers use acoustic echo transducer technology to measure distances without physically measuring the distances, at least in a conventional sense. By transmitting an ultrasonic signal from the ultrasonic transducer 38 at a first location to a surface at a second location (such as the rear of a trailer, for example), and then measuring the amount of time it takes the ultrasonic signal to reach the surface and be reflected back to the ultrasonic transducer 38, the distance between the ultrasonic transducer 38 and the surface may be determined with a high degree of precision.

The principle of operation of ultrasonic distance measuring devices is relatively simple. The ultrasonic transducer 38 is oscillated at or near its resonant frequency by the transducer circuitry 36, and the ultrasonic transducer 38 then produces an ultrasonic signal. Since the ultrasonic transducer 38 produces a relatively directional ultrasonic signal, the ultrasonic signal may be aimed in a desired direction toward a surface (such as the rear of a trailer, for example). When the ultrasonic signal reaches the surface, it will be reflected back toward the ultrasonic transducer 38, which will detect the reflected acoustic signal.

By measuring the amount of time that it takes for the ultrasonic signal to complete its round trip between the ultrasonic transducer 38 and the surface onto which it was directed (from the ultrasonic transducer 38 to the surface and back to the ultrasonic transducer 38), the distance between the ultrasonic transducer 38 and the surface can be computed. Typically, the ultrasonic transducer 38 is pulsed by the transducer circuitry 36 briefly, with the time between the pulse and the return signal being measured. This measured interval is supplied by the transducer circuitry 36 to calculating circuitry in the microprocessor 34, which calculates the distance between the ultrasonic transducer and the surface based upon the time between the pulse and the return signal and provides an output indicating the calculated distance through the modular jack 30 to the display module 22 via the cable 24.

It is desirable to provide a minimum offset distance of a few inches or so between the rear of the trailer and the loading dock or other object when the tractor/trailer is properly parked at the loading dock. When the rear of the trailer is located this minimum offset distance from the loading dock or other fixed object, the transducer module 20 should provide an indication that the distance between the rear of the trailer and the loading dock is zero. The exact amount of this minimum offset distance may be selected using an offset adjustment switch 40 to provide this information to the microprocessor 34. In the preferred embodiment, the offset adjustment switch 40 is a four pole DIP switch providing 16 different minimum offset distances which may range from zero to fifteen inches, for example. Thus, for example, if the offset adjustment switch 40 is set for three inches, the transducer module 20 will indicate zero when the rear of the trailer is located three inches from the ultrasonic transducer 38.

Referring now to the display module 22, it may be seen that the modular plug 28 of the cable 24 may be plugged into a modular jack 42 to electrically connect the display module 22 to the cable 24. A step-down transformer 44 is used to lower the level of AC voltage supplied to the display module 22. The lowered AC voltage is supplied from the step-down transformer 44 to a rectifier/regulator 46 which, as its name implies, rectifies the lowered AC voltage and provides as an output a regulated DC voltage. The regulated DC voltage from the rectifier/regulator 46 is supplied to the cable 24 through the modular jack 42 to provide power to the transducer module 20.

The regulated DC voltage from the rectifier/regulator 46 is also supplied to transient suppression circuitry 48, a microprocessor 50, a display driver 52, and a display 54. The output from the microprocessor 34 in the transducer module 20 (which is indicative of the distance between the ultrasonic transducer 38 and the rear of a trailer) is supplied via the cable 24 through the modular jack 42 to the transient suppression circuitry 48, where it is conditioned by the transient suppression circuitry 48 to remove voltage spikes and other undesirable transients. The transient suppression circuitry 48 supplies the conditioned signal to the microprocessor 50, which in the preferred embodiment is also an 8-bit microprocessor.

The microprocessor 50 converts the conditioned signal to a numeric value, which is then supplied to the display driver 52. The display driver 52 is used to operate the display 54, which in the preferred embodiment is a two digit numeric display ranging from zero to nineteen (feet). The display 54 will be more fully described in conjunction with the description of FIG. 2 below.

Optionally, the display module 22 may also include peripheral circuitry 56 which may be used to drive additional information output components. The rectifier/regulator 46 is connected to supply regulated DC voltage to the peripheral circuitry 56. The peripheral circuitry 56 may be used to drive an audio transducer 58 to produce an audible alarm when the transducer module 20 goes from one foot to zero (indicating that the rear of the trailer is located the predetermined minimum offset distance of three inches from the ultrasonic transducer 38).

The peripheral circuitry 56 is also shown as being connected to provide the numeric value from the microprocessor 50 to a modular jack 60, which is electrically connected to a second display unit 62 by a cable 64. The cable 64 has a modular plug 66 located at one end thereof, and a modular plug 68 located at the other end thereof. The modular plug 66 is for electrical connection to the display module 22, while the modular plug 68 is for electrical connection to the second display unit 62.

It may be seen that the modular plug 66 of the cable 62 may be plugged into the modular jack 60 to electrically connect the display module 22 to the cable 64. The modular plug 68 of the cable 64 may be plugged into a modular jack (not shown) in the second display unit 62 to electrically connect the second display unit 62 to the cable 64. The second display unit 62 would consist of a display driver similar to the display driver 52, and a display similar to the display 54. The second display unit 62 may be located in a location different from the location of the display module 22.

Referring next to FIG. 2, the display module 22 is illustrated with its display 54 having a first two digit numeric display 70 and a second two digit numeric display 72. Both the first and second two digit numeric displays 70 and 72 have a first digit which may be selectively actuated to produce a one and a seven segment second digit which may be selectively actuated to produce any number between zero and nine. Thus, each of the first and second two digit numeric displays 70 and 72 may selectively be operated to produce a number between zero and nineteen (feet). In operation, the first and second two digit numeric displays 70 and 72 are tied together so that each produces the same number.

The first two digit numeric display 70 is located on the top half of the display 54, and in the preferred embodiment is of a first color. The second two digit numeric display 72 is located on the bottom half of the display 54, and in the preferred embodiment is of a second color. The first two digit numeric display 70 will display a number in conventional fashion, and is viewable by looking directly at the display module 22. The second two digit numeric display 72 will display a reversed or mirror image of the number, such that it is readable only by looking at the reflection of the second two digit numeric display 72 in a mirror. In the preferred embodiment, the first two digit numeric display 70 is red and the second two digit numeric display 72 is green; it is essential that the two colors chosen are clearly distinct from each other.

Referring now to FIG. 3, a loading dock 80 of conventional height is illustrated. A wood bumper 82 is mounted on the side of the loading dock 80 such that the top surface of the wood bumper 82 is level with the top surface of the loading dock 80. A metal bumper plate 84 is mounted onto the central portion of the wood bumper 82, and extends approximately two-thirds of the width of the wood bumper 82. A metal plate 86 having the same width as the metal bumper plate 84 is located on the top surface of the wood bumper 82, and extends onto the top surface of the loading dock 80.

The transducer module 20 is mounted slightly below the bottom of the metal bumper plate 84 and is aligned with the center of the metal bumper plate 84. In practice, the transducer module 20 will be recessed inwardly from the metal bumper plate 84 to protect the transducer module 20 from damage. Thus, the total offset distance programmed into the transducer module 20 will have to be the desired minimum offset distance (the distance between the rear of the trailer and the metal bumper plate 84 on the loading dock 80 when the trailer is properly parked) plus the distance that the ultrasonic transducer 38 of the transducer module 20 is recessed inwardly from the metal bumper plate 84.

The display module 22 is mounted at the top of the loading dock 80 to the right of the transducer module 20 (as viewed when facing the loading dock from the direction from which trailers will be backed in). When a trailer is backed up to the loading dock 80 such that its back end is centered with the metal bumper plate 84 on the loading dock 80, the display module 22 will be located several feet to the left of the trailer.

A first segment of conduit 88 extends between the transducer module 20 and the display module 22, and the cable 24 (illustrated in FIG. 1) will be located inside the first segment of conduit 88. A second segment of conduit 90 extends from the display module 22, and wires (not shown) are located inside the second segment of conduit 90 to supply power to the collision avoidance system of the present invention.

Referring next to FIG. 4, a tractor 92 is illustrated as it is backing a trailer 94 toward the loading dock 80. In addition to the display module 22 mounted on the loading dock 80, an enlarged display module 22 is also inset into FIG. 4 above the loading dock 80. In FIG. 4, the rear of the trailer 94 is indicated by the display 54 on the display module 22 to be seventeen feet from the metal bumper plate 84 on the loading dock 80. Note that the first two digit numeric display 70 may be read by the driver of the tractor 92 by looking out the window of the cab of the tractor 92 and back toward the loading dock 80. Alternately, the second two digit numeric display 72 may be read by the driver of the tractor 92 by looking in the side view mirror of the tractor 92 back toward the loading dock 80.

Referring next to FIG. 5, the tractor 92 is shown to have backed the trailer 94 closer to the metal bumper plate 84 of the loading dock 80. The rear of the trailer 94 is indicated by the display 54 on the display module 22 to be eight feet from the metal bumper plate 84 on the loading dock 80.

Referring finally to FIG. 6, the tractor 92 is shown to have backed the trailer 94 to within the minimum offset distance (three inches) of the metal bumper plate 84 of the loading dock 80. At this point, the rear of the trailer 94 is indicated by the display 54 on the display module 22 to be zero feet from the metal bumper plate 84 on the loading dock 80. If the audio transducer 58 (illustrated in FIG. 1) is utilized, at this point it will produce an audible alarm. Note that if the second display unit 62 is utilized, it may, for example, be mounted at a point immediately to the left of the cab of the tractor 92 at the location at which it is shown in FIG. 5.

It may therefore be appreciated from the above detailed description of the preferred embodiment of the present invention that it teaches an apparatus and a related method of operating the apparatus for providing an indication of the distance remaining between the rear of the trailer and a loading dock or other similar fixed object as the trailer is backed toward the loading dock or other fixed object. The collision avoidance system of the present invention is permanently mountable on a loading dock or other fixed object in a manner such that it will reliably determine the distance between the rear of a trailer being backed toward the loading dock or other fixed object and the loading dock or other fixed object. The collision avoidance system of the present invention is also capable of providing a minimum offset distance between the rear of a trailer and the loading dock or other object such that there may be an adjustable small space, e.g. a few inches, between the rear of the trailer and the loading dock or other object when the tractor/trailer is properly parked at the loading dock.

The collision avoidance system of the present invention is operable in a manner not requiring the driver of the tractor/trailer to get out of the cab of the tractor in order to determine the distance between the rear of the trailer and the loading dock or other fixed object. A display for the collision avoidance system of the present invention may be installed on the loading dock or other fixed object in a position which may easily be viewed by the driver while the driver is located in the cab of the tractor. The display of the collision avoidance system of the present invention which is mounted on the loading dock or other fixed object may be viewed by the driver either by looking out the window of the cab of the tractor and back toward the loading dock or other fixed object, or by looking in the side view mirror of the tractor back toward the loading dock or other fixed object.

The collision avoidance system of the present invention is of a construction which is both durable and long lasting, and which will require little or no maintenance to be provided by the user throughout its operating lifetime. The collision avoidance system of the present invention is also of inexpensive construction to enhance its market appeal and to thereby afford it the broadest possible market. Finally, all of the aforesaid advantages and objectives of the collision avoidance system of the present invention are achieved without incurring any substantial relative disadvantage.

Although an exemplary embodiment of the collision avoidance system of the present invention has been shown and described with reference to particular embodiments and applications thereof, it will be apparent to those having ordinary skill in the art that a number of changes, modifications, or alterations to the invention as described herein may be made, none of which depart from the spirit or scope of the present invention. All such changes, modifications, and alterations should therefore be seen as being within the scope of the present invention.

What is claimed is:

1. A collision avoidance system for guiding the driver of a tractor backing a trailer toward a loading dock, said collision avoidance system comprising:

a transducer module mounted on a side of the loading dock facing the rear of the trailer, said transducer module being for determining the distance between the rear of trailer and the loading dock, said transducer module providing as an output thereof said distance so determined; and a display module mounted in a fixed position with respect to the loading dock, said display module being operatively connected to receive said distance provided as an output from said transducer module, said display module providing first and second numeric displays of said distance which first and second numeric displays may be seen by the driver of the tractor backing the trailer toward the loading dock, wherein said first numeric display comprises a conventional numeric display and said second numeric display comprises a reversed or mirror image numeric display.

2. A collision avoidance system as defined in claim 1, wherein said transducer module comprises:

a transmitter/receiver for transmitting a signal which may be directed onto the rear of the trailer and for receiving the portion of said signal which is reflected from the rear of the trailer to said transmitter/receiver; and circuitry for operating said transmitter/receiver and for providing as an output of said transmitter/receiver circuitry the time it takes said signal to travel from said transmitter/receiver to the rear of the trailer and back to said transmitter/receiver.

3. A collision avoidance system as defined in claim 2, wherein said transmitter/receiver comprises:

an ultrasonic transmitter/receiver transducer.

4. A collision avoidance system as defined in claim 2, wherein said transducer module additionally comprises:

a first microprocessor for calculating the distance between the rear of the trailer and the loading dock based upon the time it takes said signal to travel from said transmitter/receiver to the rear of the trailer and back to said transmitter/receiver.

5. A collision avoidance system as defined in claim 4, wherein said transducer module additionally comprises:

an offset adjustment switch for selecting a total offset distance which is the sum of the distance that the outermost portion of the loading dock extends beyond said transmitter/receiver and the desired minimum offset distance between the rear of the trailer and the outermost portion of the loading dock when the trailer is properly parked at the loading dock.

6. A collision avoidance system as defined in claim 5, wherein said offset adjustment switch comprises:

a multiple pole DIP switch providing a plurality of different total offset distances.

7. A collision avoidance system as defined in claim 4, wherein said display module comprises:

a second microprocessor for converting the distance between the rear of the trailer and the loading dock supplied by said first microprocessor into a numeric value.

8. A collision avoidance system as defined in claim 1, wherein said display module comprises:

a display surface having discrete first and second display areas located thereupon, said first display area being for displaying said first numeric display thereupon and said second display area being for displaying said second numeric display thereupon.

9. A collision avoidance system as defined in claim 8, wherein said first display area on said display surface is located above said second display area on said display surface when said display module is mounted in said fixed position.

10. A collision avoidance system as defined in claim 1, wherein said first numeric display is of a first color and said second numeric display is of a second color which is different from said first color.

11. A collision avoidance system as defined in claim 10, wherein said first and second colors are clearly distinct from each other.

12. A collision avoidance system as defined in claim 10, wherein one of said first and second colors is red and the other of said first and second colors is green.

13. A collision avoidance system as defined in claim 1, wherein said first and second numeric displays are each two digit displays in which the first digit is limited to a one such that said first and second numeric displays may selectively be operated to produce a number between zero and nineteen.

14. A collision avoidance system as defined in claim 1, additionally comprising:

an audio transducer for providing an audible alarm when the number displayed by said first and second numeric displays goes from one to zero.

15. A collision avoidance system as defined in claim 1, additionally comprising:

a second display unit for providing a third numeric display of said distance, said second display unit being for location in a fixed position at a location which is spaced away from the location of said display module.

16. A collision avoidance system as defined in claim 1, wherein said transducer module is adapted for mounting on a side of the loading dock, and wherein said display module is adapted for mounting on the loading dock at a top edge thereof.

17. A collision avoidance system as defined in claim 1, wherein said display module comprises:

a microprocessor for converting the distance between the rear of the trailer and the loading dock supplied by said transducer module into a numeric value and supplying the same as an output;

a display having said first numeric display and said second numeric display located thereupon, said first and second numeric displays each comprising multi-segment displays; and a display driver for converting said numeric value supplied by said microprocessor into signals to operate said first and second numeric displays to display said numeric value on each of said first and second numeric displays.

18. A collision avoidance system as defined in claim 1, additionally comprising:

a cable for electrically connecting said transducer module to said display module.

19. A collision avoidance system for guiding the driver of a tractor backing a trailer toward a loading dock, said collision avoidance system comprising:

an ultrasonic transmitter/receiver mounted on the side of the loading dock facing the rear of the trailer, said ultrasonic transmitter/receiver being for transmitting an ultrasonic signal which may be directed onto the rear of the trailer and for receiving the portion of said ultrasonic signal which is reflected from the rear of the trailer to said ultrasonic transmitter/receiver;

circuitry for operating said ultrasonic transmitter/receiver and for providing as an output of said ultrasonic transmitter/receiver circuitry the time it takes said ultrasonic signal to travel from said ultrasonic transmitter/receiver to the rear of the trailer and back to said ultrasonic transmitter/receiver;

a first processor for calculating the distance between the rear of the trailer and the loading dock based upon the time it takes said ultrasonic signal to travel from said ultrasonic transmitter/receiver to the rear of the trailer and back to said ultrasonic transmitter/receiver;

a second processor for converting the distance between the rear of the trailer and the loading dock supplied by said first processor into a numeric value;

a display module mounted in a fixed position with respect to the loading dock, said display module comprising first and second numeric displays which may be seen by the driver of the tractor backing the trailer toward the loading dock, wherein said first numeric display comprises a conventional numeric display and said second numeric display comprises a reversed or mirror image numeric display; and a display driver for converting said numeric value supplied by said second processor into signals to operate said first and second numeric displays to display said numeric value on each of said first and second numeric displays.

20. A method for guiding the driver of a tractor backing a trailer toward a loading dock in a manner which will prevent the rear of the trailer from colliding with the loading dock, said method comprising:

determining the distance between the rear of the trailer and the loading dock with a transducer module which is mounted on the side of the loading dock facing the rear of the trailer, said transducer module providing as an output thereof said distance so determined; and providing first and second numeric displays of said distance on a display module which is mounted in a fixed position with respect to the loading dock and which is operatively connected to receive said distance provided as an output from said transducer module, said first and second numeric displays of said distance being visible to the driver of the tractor backing the trailer toward the loading dock, wherein said first numeric display comprises a conventional numeric display and said second numeric display comprises a reversed or mirror image numeric display.

* * * * *